United States Patent [19]

King et al.

[11] Patent Number: 4,876,107

[45] Date of Patent: Oct. 24, 1989

[54] SUBSTITUTE MILK FAT COMPOSITIONS

[75] Inventors: David M. King, Billericay; Frederick B. Padley, Bedford, both of England

[73] Assignee: Unilever Patent Holdings BV, Rotterdam, Netherlands

[21] Appl. No.: 178,880

[22] Filed: Apr. 4, 1988

Related U.S. Application Data

[63] Continuation of Ser. No. 884,931, Jul. 14, 1986, abandoned.

[30] Foreign Application Priority Data

Jul. 12, 1985 [GB] United Kingdom ............... 8517677

[51] Int. Cl.⁴ ............................................. A23C 11/00
[52] U.S. Cl. ................................ 426/601; 260/410.7; 426/607; 426/801
[58] Field of Search ............... 426/801, 601, 607, 33; 260/410.7

[56] References Cited

U.S. PATENT DOCUMENTS

| | | | |
|---|---|---|---|
| 3,542,560 | 11/1970 | Tomarelli et al. | 426/801 |
| 3,649,295 | 3/1972 | Bernhart | 426/601 X |
| 4,268,527 | 5/1981 | Matsuo et al. | 426/33 |
| 4,275,081 | 6/1981 | Coleman et al. | 426/601 X |
| 4,282,265 | 8/1981 | Theuer | 426/801 |

FOREIGN PATENT DOCUMENTS

| | | | |
|---|---|---|---|
| WO83/00161 | 1/1983 | PCT Int'l Appl. | 426/33 |
| 1577933 | 10/1980 | United Kingdom . | |

OTHER PUBLICATIONS

Ned. T. Geneesk. 124, nr. 38, 1980, pp. 1577–1579.
J. Pediatr Gastroenterol Nutr., vol. 3, No. 2, 1984, p. 175.
C. J. Lammi-Keefe and R. G. Jensen, Journal of Pediatric Gastroenterology and Nutrition, 3:172–198, 1984 Raven Press, NY, pp. 172–199.

*Primary Examiner*—Donald E. Czaja
*Assistant Examiner*—Celine T. Callahan
*Attorney, Agent, or Firm*—Cushman, Darby & Cushman

[57] ABSTRACT

Substitute milk fat especially as a replacement fat in infant formulations comprises 2-saturated glycerides especially 2-palmitic acid-glycerides, in which the 1, 3 positions are randomly occupied substantially by different shorter chain and/or unsaturated fatty acids. These glycerides are prepared by selective rearrangement of glycerides using 1, 3-regiospecific lipase enzymes as rearrangement catalysts, preferably in acidolysis rearrangement using unsaturated acid or alkyl ester thereof.

10 Claims, No Drawings

SUBSTITUTE MILK FAT COMPOSITIONS

This is a continuation of application Ser. No. 884,931, filed July 14, 1986, which was abandoned upon the filing hereof.

This invention relates to substitute milk fat compositions, for replacing at least part of the milk fat necessary to feed young mammals and especially infants. The invention also relates to their preparation by rearrangement of fats using lipase enzymes as rearrangement catalysts, and to milk substitutes containing such fats.

Milk replacement fats should match the performance of milk fat as closely as possible in order to reproduce its physical and dietary characteristics. Human milk fat consists of a variety of triglycerides of both saturated and unsaturated fatty acids, the former being chiefly palmitic acid with a smaller amount of stearic and myristic acids and a small but significant amount of shorter chain acids. The unsaturated acids consist substantially of oleic with smaller quantities of linoleic and palmitoleic acid and a little linolenic acid.

Infant formulations are based on fat, carbohydrate and protein, together with added vitamins, essential minerals and other minor components. The proportions of these and the major components has been adjusted from time to time in an effort to develop a formula more nearly approximating to mother's milk, and where special formulae were needed for premature infants or those with metabolic difficulties. For example, skim milk may be replaced by soy isolate as the protein source for infants with cows' milk sensitivity and lactose as the carbohydrate may be replaced by other sugars and starches. For the fat component, both animal and vegetable fats have been used.

Fat compositions containing similar amounts of the principal fatty acids of milk fat may be derived from oils and fats of vegetable origin. With the notable exception of so-called lauric fats such as coconut and palm kernel oils, most vegetable oils and fats consist substantially of $C_{16}$ and $C_{18}$ fatty acids, although shorter-chain fatty acids e.g., $C_4$ characteristic of bouine milk fat are notably absent. The non-lauric vegetable fats and oils also tend to be more highly unsaturated than milk fat—at any rate that of land-based mammals. Nevertheless, fats may be derived with generally similar fatty acid composition to milk fat.

A significant difference nevertheless remains which is believed to have important dietary consequences; most glycerides of vegetable origin are overwhelmingly unsaturated in the 2- position, chiefly oleic and linoleic acids. In contrast, substantial amounts of palmitic acid occupy the 2- position of glycerides in human milk fat, more than half the total fatty acid there being palmitic acid, and the preponderance to total palmitic acid in the fat being located in this position, the major glyceride of human milk fat being 1, 3 di-oleoyl-2-palmitoly glyceride. Randomisation of vegetable-based fats containing palmitic acid residues leave insufficient in the 2-position of the product to provide a good match, without placing excessive amounts of palmitic acid in the other positions, thereby including unwanted glycerides in the composition. Fractional crystallisation to remove glycerides containing palmitic acid in the 1, 3-positions is tedious, expensive and usually unsuccessful.

The distribution of fatty acids and the triglycerides of some milk fats of nutritional importance was studied by Freeman, Jack and Smith (J. Dairy Sci., 1965, p.853), who reported that in human milk fat is greater proporation of palmitic acid appears in the 2-position and of stearic acid and oleic acid in the 1, 3 positions than in the milk fat of ruminants. The greater absorption of palmitic acid in the 2-position of triglycerides by infants was reported by Filer, Mattson and Fomen (J. Nutrition, 99, pp 293–298), who suggested that the relatively poor absorption of butter fat by infants compared with human milk fat is attributable to its substantially uniform distribution of palmitic acid between the glyceride positions of the fat. Experiments shows that about 95% unrandomised lard could be absorbed by infants compared with about 70% for randomised lard, in which less palmitic acid appears in the 2-position. The conclusion that fatty acid is better absorbed in the 2-position is believed to hold for all fatty acids, but palmitic acid is of particular importance for infants and stearic acid to a lesser extent.

The present invention provides a novel fat composition suitable for replacing at least part of the fat in infant food formulations comprising a mixture of glycerides wherein different fatty acid residues in the 1- and 3- positions are randomly distributed between these positions and include unsaturated residues, wherein at least half of those in the 2- position are $C_{16}$ and/or $C_{18}$ saturated, preferably consisting substantially of palmitic acid, particularly 60–90% by weight of the total 2-position fatty acids. All the fatty acids, or virtually all, should be unbranched and even-numbered.

The 1-, 3- positions of the novel compositions according to the invention include unsaturated fatty acids. These should preferably consist largely of oleic acid with linoleic acid and palmitoleic and less than 1% others. Preferably also the compositions include at least as much saturated fatty acid in the 2-position as in the 1- and 3- positions combined, more preferably up to twice as much. Preferably also the 1, 3 positions include both unsaturated $C_{18}$ and saturated $C_4$ and $C_{14}$ fatty acids. The proportion and variety of these fatty acids may be determined in accordance with dietary and physical requirements of the composition required. Milk replacement fats should be capable of emulsification at blood heat in liquid feed and should therefore preferably be melted at this temperature. The melting point of fats is determined by their fatty acid composition which may be selected accordingly.

Other fats, particularly lauric fats, may be included in the compositions of the invention to provide blends matching the compositions of milk fat or its melting characteristics, and also vegetable oils for example sunflower oil and soya bean oil, having a high content of polyunsaturated fatty acid glycerides, to improve the dietary benefit of the compositions of the invention.

Novel compositions according to the invention may be obtained by rearrangement of fatty mixtures comprising glycerides consisting substantially of more saturated 2-palmityl glycerides, under the influence as rearrangement catalyst of an enzyme lipase which is regiospecific in activity in the 1 and 3 positions only of glycerides. Processes of this kind are described in our British patent specification 1577933. Under the influence of the catalyst, unsaturated fatty acid residues may be introduced into the 1- and 3-positions of the 2- palmityl glycerides by exchange with other glycerides or more preferably by means of acidolysis reagents in the fatty mixture, particularly unsaturated free fatty acids preferably oleic acid or their alkyl esters. Shorter chain saturated acids may alernatively be introduced. The 2- palmityl glycerides modified in this way may then be separated from the product. A mixture of acidolysis reagents may be used to provide a mixture of glycerides in the product conforming substantially to that of milk fat. The reaction is preferably carried out at a temperature from 10° to 90° C. and may be performed batchwise or continuous fashion, with or without a water-immiscible organic solvent.

A suitable source of 2- palmityl glyceride for use in this process may be obtained as a top fraction of palm oil, which contains up to 92% trisaturated acid glycerides including tripalmitin. Generally a top fraction contains about 4 parts tripalmitin and 1 part symmetrical disaturated triglycerides.

The novel compositions of the invention comprise a symmetrical 2-saturated $C_{16}/C_{18}$ glyceride mixture, the 1- and 3-positions containing statistically the same fatty acid residue composition comprising more than one fatty acid.

The present invention also provides infant food compositions comprising fat, protein and carbohydrate components in the approximate relative weight proportions 2.5:1:5, wherein at least part of the fat normally used in such formulations is replaced by an enzyme-rearranged fat in accordance with the present invention. Dry formulations containing this component mixture, together with additional components customary in such formulations, should be dispersed for use in sufficient water to produce an emulsion of approximately 3½ grams of fat per 100 mls. of dispersion.

EXAMPLE 1

Calculations appear in the following Table I for the analysis of three glyceride compositions that may be provided by rearrangement of a mixture of a top fraction of palm oil with either oleic acid in the proportion 3:1 acid:oil (Sample 2) or an alternative fatty acid composition (FAM) used in proportions of 2:1 and 3:1 FAM:oil by weight of the feedstock (Samples 1 and 3). The mixture was rearranged at 40° C. in a solution in hexane, using Mucor miehei enzyme as rearrangement catalyst. The catalyst was supported on Celite and activated by slurrying with water before use. The method used was in accordance with our British patent specification No. 1577933. Free fatty acid was removed from the reaction product by steam stripping.

The fatty acid composition (FAM) consisted of: Palmitoleic 6; stearic 12; oleic 69; linoleic 10 and others 2 and the palm top fraction was 80% $P_3$ and 20% POP (P=palmitic; O=oleic).

TABLE I

| SAMPLE | SUBSTITUENT POSITION | WT % FATTY ACID | | | | |
|---|---|---|---|---|---|---|
| | | $C_{16:0}$ | $C_{16:1}$ | $C_{18:0}$ | $C_{18:1}$ | $C_{18:2}$ |
| 1 | 1 + 3 | 27 | 5 | 9 | 52 | 7 |
| | 2 | 80 | — | — | 20 | — |
| | TOTAL | 44.5 | 3.5 | 6 | 41.5 | 4.5 |
| 2 | 1 + 3 | 20 | — | — | 80 | — |
| | 2 | 80 | — | — | 20 | — |
| | TOTAL | 40 | — | — | 60 | — |
| 3 | 1 + 3 | 20 | 5 | 10 | 57 | 8 |
| | 2 | 80 | — | — | 20 | — |
| | TOTAL | 40 | 3.5 | 6.5 | 44.5 | 5.5 |

TABLE 2

| Blend | Sample | SF | PK | SB |
|---|---|---|---|---|
| 1 | (1) 70 | 10 | 20 | |
| 2 | (1) 50 | 10 | 10 | 30 |
| 3 | (2) 70 | 20 | 10 | |
| 4 | (3) 70 | 10 | 20 | |

TABLE 3

| | | 12:0 | 14:0 | 16:0 | 16:1 | 18:0 | 18:1 | 18:2 |
|---|---|---|---|---|---|---|---|---|
| TOTAL FATTY ACID COMPOSITION | | | | | | | | |
| MILK FAT | | 2.3 | 5.0 | 25.7 | 5.1 | 7.1 | 38.5 | 11.7 |
| BLENDS | 1 | 9.5 | 3.0 | 33.0 | 2.0 | 5.5 | 35.0 | 10.5 |
| | 2 | 5.0 | 2.0 | 26.0 | 1.5 | 5.0 | 33.5 | 23.0 |
| | 3 | 5.0 | 1.5 | 30.0 | N.D. | 1.0 | 47.5 | 15.0 |
| | 4 | 10.0 | 3.0 | 30.5 | 2.5 | 5.0 | 36.5 | 10.5 |
| 2-POSITION FATTY ACID | | | | | | | | |
| MILK FAT | | 1.6 | 6.5 | 57.5 | 4.6 | 3.6 | 13.8 | 7.9 |
| BLENDS | 1 | 9.5 | 3 | 57.0 | 3.5 | 8.0 | 22.0 | 11.5 |
| | 2 | 5.5 | 1.5 | 41.0 | N.D. | N.D. | 23.5 | 26.5 |
| | 3 | 5.0 | 1.5 | 56.5 | N.D. | N.D. | 21.0 | 16.0 |
| | 4 | 10.0 | 3.0 | 57.0 | N.D. | N.D. | 22.0 | 8.0 |
| 1,3-POSITION FATTY ACIDS | | | | | | | | |
| MILK FAT | | 2.6 | 4.3 | 10.3 | 5.3 | 8.8 | 50.3 | 13.5 |
| BLENDS | 1 | 9.5 | 3.0 | 21.0 | 3.0 | 7.5 | 41.5 | 11.5 |
| | 2 | 5.0 | 2.0 | 19.0 | 2.5 | 7.0 | 39.0 | 21.5 |
| | 3 | 5.0 | 1.5 | 17.0 | N.D. | 1.5 | 61.0 | 14.0 |
| | 4 | 10.0 | 3.0 | 17.5 | 3.5 | 7.5 | 43.5 | 12.0 |

N.D. = NONE DETECTED

From Table 3 it will be apparent that good similarity is obtained in fatty acid content and distribution with milk fat, particularly by blends 3 and 4. A high 2-palmitic acid distribution is obtained in all the blends, matching that of milk fat, without unduly increasing the palmitic acid in the other glyceride positions. Lauric acid is consistently higher all round, providing a dietary advantage for infants, while myristic acid is marginally lower. Of the longer-chain acids, palmitoleic and stearic are present in similar amounts with a similar distribution except in the 2-position, while oleic acid is significantly higher in the 2-position in the blends, which also showed generally high linoleic acid in the 2-position but not overall.

Entries in all the Tables are percentages by weight and quantities given elsewhere are all percentages by weight unless otherwise specified. Milk fat compositions are based on data reported in mole per cent, assuming an average molecular weight for unspecified fatty acids of $C_{15:0}$. Summations less than 100% are accounted for by the presence of other acids.

EXAMPLE 2

A mixture of 100 grams of an upper-melting fraction of palm oil consisting substantially of 4 parts tripalmitin and 1 part 1, 3-dipalmityol-2-oleoyl glyceride with 200 grams of oleic acid was dissolved in 400 grams of hexane. 25 grams of rearrangement catalyst was added and the mixture agitated at 55° C. for 24 hours. The catalyst comprised *Mucor miehei* lipase enzyme deposited on Celite in the manner described in our British patent specification no. 1577933. The catalyst was pre-activated by the addition of 10% water by weight of the catalyst.

After separating the catalyst by filtration and distilling off the solvent, the residue remaining was distilled in a molecular still at 235° C. and $6 \times 10^{-3}$ mm. Hg. to remove free fatty acid as a distillate amounting to 80% by weight of the total residue. The acid distillate and triglyceride fraction remaining were analysed for free fatty acid and partial glyceride, and the triglyceride composition was further analysed for individual triglycerides. Particulars of these analyses are given in Table 4.

TABLE 4

| Fraction | SSS | SOS | SSO | SInS | SOO | OSO | Others |
|---|---|---|---|---|---|---|---|
| Triglyceride | 9.5 | 6.5 | 23.9 | 5.1 | 15.7 | 21.5 | 18.7 |

Blends were made of the triglyceride fraction with additional fats to emulate the composition of human milk fat, blend A containing 10% of sunflower oil and a 20% palm kernel oil and blend B containing 10% each of sunflower and palm kernel oil and soya bean oil.

In Table 5 the fatty acid content of the triglyceride fraction and the blends made from it is compared with human milk, showing in particular that a good match is made by the blends with the principal acids in human milk fat. In Table 6 the corresponding data appears for fatty acids in the 2-position and shows that the triglyceride fraction contains substantially the same amount of palmitic acid in the 2-position as human milk fat and that, while a fall in the amount is apparent in the blends, a substantial amount remains in this position. Corresponding solid content values measured by pulse NMR methods were obtained and appear in Table 7 where they are compared with butter oil which is used extensively in the preparation of baby milk formulations.

TABLE 5

| TOTAL FATTY ACID COMPOSITION | 12:0 | 14:0 | 16:0 | 16:1 | 18:0 | 18:1 | 18:2 | OTHERS |
|---|---|---|---|---|---|---|---|---|
| HUMAN MILK | 2.3 | 5.0 | 25.7 | 5.1 | 7.1 | 38.5 | 11.7 | 4.6 |
| BLEND A | 12.9 | 4.7 | 30.2 | 2.0 | 3.2 | 34.5 | 10.6 | 1.9 |
| BLEND B | 6.3 | 2.6 | 24.4 | 1.5 | 3.4 | 33.6 | 24.4 | 3.7 |
| TRIGLYCERIDE FRACTION | 0.6 | 1.8 | 41.0 | 3.1 | 3.0 | 43.6 | 4.4 | 2.5 |

TABLE 6

| 2 POSITION FATTY ACID | 12:0 | 14:0 | 16:0 | 16:1 | 18:0 | 18:1 | 18:2 | OTHERS |
|---|---|---|---|---|---|---|---|---|
| HUMAN MILK | 1.6 | 6.5 | 57.5 | 4.6 | 3.6 | 13.8 | 7.9 | 4.5 |
| BLEND A | 9.0 | 4.2 | 37.0 | 1.4 | 3.5 | 30.3 | 13.3 | 1.3 |
| BLEND B | 4.5 | 2.1 | 25.5 | 1.4 | 3.0 | 27.6 | 30.0 | 5.6 |
| TRIGLYCERIDE FRACTION | — | 1.4 | 55.2 | 2.3 | 4.0 | 32.9 | 4.2 | — |

TABLE 7

| TEMP °C. | 0 | 5 | 10 | 15 | 20 | 25 | 30 | 35 | 40 |
|---|---|---|---|---|---|---|---|---|---|
| BLEND A | 54 | 52 | 45 | 32 | 21 | 11 | 7 | 4 | 3 |
| BLEND B | 37 | 35 | 28 | 18 | 12 | 6 | 4 | 2 | 1 |
| TRIGLYCERIDE FRACTION | 61 | 59 | 54 | 41 | 30 | 19 | 13 | 8 | 4 |
| BUTTER OIL | 53 | 49 | 42 | 29 | 15 | 9 | 5 | 1 | 0 |

We claim:

1. A rearranged vegetable fat composition consisting essentially of a mixture of glycerides of unbranched and even-numbered fatty acids residues of which at least half in the 2-position are palmitic acid residues and in which those in the 1- and 3-positions are randomly distributed between these positions and consist essentially of unsaturated $C_{16}$ and $C_{18}$ fatty acid residues and no more saturated fatty acid residues than in the 2-position.

2. A rearranged vegetable fat composition according to claim 1 wherein the 1, 3-position fatty acid residues further comprise not more than 20% palmitic acid.

3. A rearranged vegetable fat composition according to claim 1, the fatty acid residues in the glycerides of which further comprise up to twice as much saturated fatty acid in the 2-position as in the 1, 3-positions combined.

4. A rearranged vegetable fat composition according to claim 1 wherein the 1 and 3-position fatty acid residues further comprise both unsaturated $C_{18}$ and saturated $C_4$ to $C_{12}$ fatty acids.

5. Infant food composition comprising approximately 1 part protein, 5 parts carbohydrate and 2½ parts fat, wherein at least part of the fat comprises a rearranged vegetable fat composition as claimed in claim 1.

6. Substitute milk fat composition comprising a rearranged vegetable fat composition consisting essentially of a mixture of glycerides of unbranched and even-numbered fatty acid residues of which at least half in the 2-position are palmitic acid residues and in which those in the 1- and 3-positions are randomly distributed between these positions and consist essentially of residues of unsaturated $C_{16}$ and $C_{18}$ fatty acids and no more saturated fatty acid residues than in the 2-position, which is blended with a lauric fat and a vegetable oil of which at least 40% of the fatty acid residues therein contain two or more double bonds.

7. Substitute milk fat composition according to claim 6 which comprises 20% lauric fat.

8. Substitute milk fat composition as claimed in claim 6 which comprises 10 to 30% of said vegetable oil.

9. Substitute milk fat composition as claimed in claim 6 wherein the lauric fat is palm kernel oil and the vegetable oil is selected from the group consisting of sunflower oil and soya bean oil.

10. Substitute milk fat composition according to claim 6, the Solids Content Index of which is within the ranges of 35° to 55° to 0° C., 20° to 50° at 10° C., 10° to 25° at 20° C. and not more than 10° at 30° C.

* * * * *